Patented July 23, 1935

2,008,726

UNITED STATES PATENT OFFICE 2,008,726

STORING AND HANDLING HYDROGEN PEROXIDE SOLUTIONS

Joseph S. Reichert, Niagara Falls, N. Y., assignor to E. I. du Pont de Nemours & Company, Inc., Wilmington, Del., a corporation of Delaware No Drawing. Application January 11, 1932, Serial No. 586,065

35 Claims. (Cl. 23—251)

This invention relates to the storage and handling of hydrogen peroxide solutions in containers of aluminum or alloys thereof, and specifically relates to inhibiting the corrosion of said vessels by the solution.

Heretofore, hydrogen peroxide solutions have been principally stored and shipped in containers made of glass or other ceramic material, although certain metal or metal lined vessels have been utilized for short storage or manufacturing operations. The use of metallic containers for transportation or longer period storage would be advantageous in decreasing losses due to breakage and enabling the use of larger containers than can now be used. Metallic containers have not been practicable before, because they are to some extent attacked by the commercial peroxide and because most metals suited for container construction, when dissolved by the peroxide, act catalytically to cause its decomposition. Some otherwise suited metals do not have the requisite physical properties for strong containers of light weight such as would be required for shipping purposes.

Aluminum and its alloys are commonly used for containers for a number of liquids non-corrosive to it, where iron or other materials cannot be used. However, commercial grades of hydrogen peroxide are corrosive to aluminum. I have found that the commercial peroxide solutions attack the metal exposed to the peroxide vapors as well as that in contact with the liquid although the corrosion is most marked where the metal is in contact with the liquid.

I have furthermore found that commercial hydrogen peroxide solutions attack aluminum and its alloys in two ways, which I herein designate as "uniform solution" and "pitting". In the "uniform solution" attack, the metal is dissolved at substantially equal rate at all points on the surface in contact with the solution and the metal is not greatly changed in appearance. "Pitting" is a localized attack wherein the metal is dissolved at a number of definite points, resulting in the formation of cavities or "pits". Severe pitting due to accelerated local action removes considerable metal, leaving a rough, dull-colored surface. In general I have found that, with a decrease of acidity of the peroxide solution there is a decrease in the rate of uniform solution but an increase in pitting action.

When aluminum is dissolved by hydrogen peroxide solutions, or aluminum ions otherwise added, decomposition of the peroxide is accelerated by the catalytic effect of the aluminum ions. Without a stabilizer this catalytic effect is at a minimum when the solution is at a pH of 4.5–5.5. This has been a further objection to the use of aluminum containers for hydrogen peroxide.

My investigations have indicated that the corrosion is probably due to or greatly accelerated by small amounts of impurities in the peroxide solution, even though they are present in amounts as small as one part of contaminating ions per million parts of peroxide solution. However this may be, I have discovered a method of minimizing this corrosion difficulty with commercial grades of hydrogen peroxide in the concentrations at which it is normally transported in large quantities so that I do not desire to be restricted in my solution by any theory as to whether this corrosion is by the peroxide itself or by the included impurities or by the combined action of both.

I have now discovered that these corrosive actions can be so inhibited or reduced that the shipment of commercial acidic or non-alkaline hydrogen peroxide solutions in aluminum containers, or storage therein, is practicable.

Briefly, I accomplish these results by adding a pitting corrosion inhibitor to the solution and adjusting the pH of the solution to a point of low uniform solution. I also preferably treat the interior of the aluminum container to inhibit the pitting corrosive action of the vapors on such portions as may not come in contact with the liquid. In order to minimize losses of hydrogen peroxide by decomposition I also preferably add a stabilizer which acts to reduce this decomposition, which perhaps acts as an anti-catalyst, to inhibit the catalytic influence of such aluminum as is dissolved as well as that of other decomposition catalysts which may be present.

In one method of carrying out my invention, the acidity of the hydrogen peroxide solution is adjusted to a pH of about 1.5–6 and a small amount of nitrate ion is added before storing the solution in the aluminum. The nitrate ion is added by way of nitric acid or a suitable soluble nitrate. I preferably use ammonium or sodium nitrate but others may be used. In general the metallic radical of the nitrate used must not be one which will act in a deleterious manner, i. e. one which will not catalyze the decomposition of hydrogen peroxide; thus copper, iron, chromium, manganese, silver or other known harmful ions should not be used. Certain metallic cations such as barium or calcium would be unsuited under some conditions. Such radicals would form insoluble salts with some stabilizers such as phosphoric acids, if they were present, and hence precipitate; or, in certain pH ranges such metals would form insoluble peroxides which would precipitate. These metals might, however, under special conditions be suitable. These effects can be determined by trial and the deleterious cations avoided.

In most cases 0.1–0.5 grams of the nitrate per liter is sufficient to substantially completely inhibit pitting corrosion of the aluminum regardless of the pH of the solution, although in some cases I have used as much as 10 grams of nitrate per liter.

The nitrate in the solution prevents the pitting corrosion of aluminum by the hydrogen peroxide solution but does not completely prevent corrosion of aluminum in contact only with hydrogen peroxide vapors. For this reason, when it is not feasible to completely fill the container or otherwise to keep all aluminum surfaces in contact with the peroxide vapors wet with the hydrogen peroxide solution containing nitrate, I prefer to treat the aluminum with nitric acid as hereinafter described before exposing it to the peroxide.

It is well known that aluminum, when treated with strong nitric acid, acquires a so-called "passivity" which is demonstrated by its increased resistance to the attack of certain corrosive chemicals. However, this treatment alone does not prevent either of the corrosive actions of commercial hydrogen peroxide solutions. This treatment, however, assists in preventing pitting corrosion by the liquid and also inhibits the corrosion of aluminum surfaces in contact with the vapor of the hydrogen peroxide solution. Furthermore, the acid treatment usually aids in preventing decomposition of the hydrogen peroxide, possibly because the acid removes impurities from the aluminum surface.

In utilizing this discovery, for example, I first treat all of the inside aluminum container surface with strong nitric acid before contacting it with the peroxide solution containing nitrate.

In general, the results obtained by pickling are in proportion to the strength of the acid used. Fifty per cent nitric acid or stronger concentrations are preferable and treatment may be applied for instance from 2 hours to several days at room temperature or at higher temperatures. Weaker solutions may be used if the time of treatment is sufficiently prolonged. I prefer to treat the aluminum with 50% nitric acid for 9–16 hours at a temperautre of between about 15° C. and 35° C. The use of higher temperatures and/or stronger acid concentrations shorten the time required for treatment. Best results are obtained by an acid treatment which reduces the weight of the metal about 1% or more. However, milder treatments are also effective to a lesser degree. After the acid treatment, I prefer to remove substantially all acid by washing the metal with water, although this is not absolutely necessary since as shown above nitrate ions in the solutions are beneficial. However, I prefer to have controlled amounts added.

If the inside surface of an aluminum container is first treated with nitric acid as above described and partially filled with hydrogen peroxide solution having an acidity corresponding to a pH of 3.5–6 and containing a nitrate in suitable concentration, for instance 0.1–0.5 grams per liter, there is substantially no corrosion of either type of the aluminum in contact with either the liquid or the vapor phase of the solution.

In the following examples, the concentrations of hydrogen peroxide solutions are expressed in terms of the volume of available oxygen in unit volume of solution. Thus, one unit volume of "100-volume" solution, measured at 20° C., when completely decomposed to oxygen and water yields 100 unit volumes of oxygen gas, measured at 0° C. and atmospheric pressure.

Example I

Five portions of an approximately 100-volume solution of hydrogen peroxide (about 0.2 g/liter dissolved solids) were prepared with acidities varying from a pH of 2 to a pH of 6 and to each was added 0.3 gm. of ammonium nitrate per liter of solution. Five other portions were prepared with the same acidities but without the addition of nitrate. A small, weighed test piece of sheet aluminum, about 2 inches by ¾ by $\frac{1}{16}$ inch and weighing approximately 4.5 grams, was suspended in each portion of peroxide solution and all were stored for one month at a constant temperature of 32° C. At the end of this time, there was no sign of corrosion of any of the aluminum test pieces in contact with the peroxide solution which contained nitrate and the solutions remained clear. All the test pieces in contact with the peroxide containing no nitrate were more or less heavily corroded, the corrosive effect being greatest in the sample having the lowest acidity and the solutions were contaminated with a precipitate of aluminum compound. In each case, the corrosion took the form of deep pits in localized areas. After the test, the aluminum test pieces were washed, dried and reweighed to determine loss in weight due to solvent action of the peroxide solutions. The results, tabulated below, also show that a small but appreciable amount of metal is dissolved without pitting by the hydrogen peroxide solutions having a pH of less than 3.5 and containing nitrate.

| | Nitrate present | | Nitrate absent | |
|---|---|---|---|---|
| pH | Loss in weight (gms.) | Appear. of metal | Loss in weight (gms.) | Appear. of metal |
| 2 | 0.0375 | Not pitted | 0.0321 | Slightly pitted |
| 3 | 0.0055 | Not pitted | 0.0055 | Slightly pitted |
| 4 | 0.0010 | Not pitted | 0.0535 | Pitted |
| 5 | 0.0001 | Not pitted | 0.3851 | Badly pitted |
| 6 | [1]−0.0007 | Not pitted | 0.6405 | Badly pitted |

[1] Test piece gained in weight, probably due to slight oxidation.

Example II

The procedure described in Example I was repeated, except that the test pieces were previously treated by immersion in 50% nitric acid at room temperature for 16 hours. The visible results, i. e. corrosion of the samples and precipitation in the solution, were practically the same. The loss in weight of the test pieces was of the same order of magnitude at the higher acidities as in Example I, but at the lower acidities the losses were markedly lower. In all cases, however, the pitting was inhibited as in the previous case:

| | Nitrate present | | Nitrate absent | |
|---|---|---|---|---|
| pH | Loss in weight (gms.) | Appear. of metal | Loss in weight (gms.) | Appear. of metal |
| 2 | 0.0444 | Not pitted | 0.0491 | Slightly pitted |
| 3 | 0.0083 | Not pitted | 0.0203 | Slightly pitted |
| 4 | 0.0001 | Not pitted | 0.0043 | Pitted |
| 5 | 0.0001 | Not pitted | 0.0031 | Badly pitted |
| 6 | [2]−0.0004 | Not pitted | 0.0107 | Badly pitted |

[2] Test piece gained in weight.

Example III

A 100 volume hydrogen peroxide solution which contained an extra large amount of deleterious solids (about 7-8 gms./liter) was selected since this condition was highly conducive to pitting corrosion. Varying amounts of ammonium nitrate were added to separate portions of this solution and unpickled aluminum test pieces were immersed therein. The observed results after several days standing were as follows:

| 1 | 0.0g NH₄NO₃ | Heavy pitting. |
| 2 | 0.3 NH₄NO₃ | Heavy pitting. |
| 3 | 1.0 NH₄NO₃ | Heavy pitting. |
| 4 | 2.0 NH₄NO₃ | Less than #3. |
| 5 | 3.0 NH₄NO₃ | Less than #4. |
| 6 | 5.0 NH₄NO₃ | Less than #5. |
| 7 | 7.0 NH₄NO₃ | Very slight. |
| 8 | 10.0 NH₄NO₃ | None. |

*Example IV*

Samples of high purity hydrogen peroxide (about 0.1 gm. solids/liter) stabilized against decomposition were placed in contact with bright aluminum strips. A sample with no nitrate present showed slight corrosion effects at the end of 24 hours; another sample containing 0.1 gm. ammonium nitrate per liter showed no evidence of any attack.

These, and similar tests, have shown that roughly the degree of pitting is dependent on the concentration of nitrate present, and is also dependent in the same degree on the amount of impurities present. Hydrogen peroxide of Example IV containing 0.1 grams of solids per liter required only 0.1 gram of ammonium nitrate per liter whereas the hydrogen peroxide of Example III containing 7-8 grams of solids per liter required about 10 grams of ammonium nitrate to effectively inhibit corrosion. Accordingly I prefer to add sufficient nitrate to substantially inhibit the pitting corrosion or to increase the amount of nitrate, if insufficient is present, until sufficient has been added to produce the desired inhibition. I have also found that the actual amount of metal removed by corrosion is lessened with nitrates present; this is not necessarily due to these inhibitors having an effect on normal "uniform" corrosion but I believe is due to the fact that in the "pitting" corrosion local action is set up which causes greatly increased or accelerated solution of metal; when this is inhibited the actual metal removal is decreased.

*Example V*

The inside surfaces of two cylindrical aluminum containers, 6" high by 6" in diameter, were treated with 50% nitric acid at room temperature for 16 hours and then were washed with distilled water to remove acid. The containers were then partially filled with approximately 100-volume hydrogen peroxide solution (0.2 gm. solids/liter having an acidity corresponding to a pH of about 4.5 and containing 0.3 gms. of ammonium nitrate per liter and which had been stabilized with sodium stannate (10 mg.Sn/liter) and sodium pyrophosphate (10 mg./liter) by the method described and claimed in my copending application, S. N. 572,721, Patent No. 1,958,204 May 8, 1934. The containers were stored for one month at 32° C., after which time the amount of hydrogen peroxide decomposition was determined and the inside of the containers examined for signs of corrosion. No detectable amount of corrosion occurred in any of the containers. Other portions of the same peroxide solution were placed in Pyrex glass containers and stored with the aluminum containers, to determine the effect of the presence of aluminum on the stability of the solution. The stability of the peroxide solution during this storage period is indicated by the small decrease in hydrogen peroxide concentration as shown in the following table:

| Container | Volume concentration | | |
| --- | --- | --- | --- |
| | At start | At 30 days | Loss |
| Aluminum | 102.2 volume | 102.0 volume | 0.2 volume. |
| Aluminum | 102.0 volume | 101.8 volume | 0.2 volume. |
| Glass | 102.0 volume | 101.9 volume | 0.1 volume. |
| Glass | 102.2 volume | 101.9 volume | 0.3 volume. |

*Example VI*

Test pieces of aluminum, suspended above 100 volume hydrogen peroxide containing 0.2 grams of ammonium nitrate per liter and other test pieces suspended above peroxide containing no nitrate were all pitted after one month. Other aluminum test pieces which were pickled in 50% nitric acid for 16 hours at room temperature were tested by suspending them over samples of 100 volume hydrogen peroxide containing 0.2 grams of ammonium nitrate per liter and other samples containing no nitrate, for one month. Those pieces suspended over peroxide containing the nitrate showed no signs of corrosion. Those suspended over the nitrate-free peroxide were only very slightly pitted.

*Example VII*

A quantity of 100 volume hydrogen peroxide solution produced by hydrolysis of persulfuric acid was neutralized directly as it came from the hydrolysis still by the addition of barium and sodium hydroxides in a series of successive stages. The pH value of the 100 volume hydrogen peroxide solution was substantially 1.0 as it came from the still due to distillation and entrainment of sulfuric acid. When a pH of 2.5 to 3 was reached the solution was divided into two portions. One of these portions was then purified and stabilized by the addition thereto of 100 milligrams of sodium pyrophosphate per liter of peroxide and 50 milligrams of a soluble tin salt per liter of peroxide; and then filtering off the precipitated tin hydroxide and impurities. Finally neutralization of this sample of the hydrogen peroxide solution was completed. The other sample was neutralized and utilized in the subsequent operations without purification or stabilization.

Both portions of the solution were now at a pH of approximately 7.2, corresponding approximately to neutrality. The sample of neutralized but unstabilized and unpurified solution was then divided into two portions which were placed in separate beakers. To that portion of the peroxide in beaker A, nitric acid was added in an amount equivalent to 0.6 grams per liter. After this treatment the pH value of the solution containing nitric acid was 3.9. The second sample of unstabilized and unpurified solution, in beaker B, was adjusted to a pH of 3.9 by sulfuric acid. The pH values of the two portions of unstabilized and unpurified hydrogen peroxide solution, one containing nitric acid and one containing no soluble nitrate, were then identical, 3.9.

The stabilized and purified hydrogen peroxide solution was also divided into two portions which were placed respectively in beakers labelled C and D. To that portion of the hydrogen peroxide placed in beaker C, nitric acid in amount equivalent to 0.6 grams per liter was added. The pH value of the solution after this treatment was 4.0. The sample of stabilized peroxide placed in beaker D was adjusted to a pH of 4.0 by sulfuric acid. The two portions of stabilized and purified hydrogen peroxide solution, one containing nitric acid and one containing no soluble nitrate had identical pH values, 4.0.

Two aluminum test strips were then placed in each of the four beakers. Prior to this insertion these strips had been "pickled" by allowing them to stand overnight in 35% nitric acid at room temperature. These test solutions were then allowed to stand for 12 days at 32° C.

The results are summarized in the following table:

*Effect of nitric acid on Al corrosion in 100 vol. $H_2O_2$ tested 12 days at 32° C.*

| $H_2O_2$ sample in beaker | Stabilizer mg./l. | | Acid added | pH before insertion of Al strip | pH at end of test | After 12 days, aluminum strips | | |
| --- | --- | --- | --- | --- | --- | --- | --- | --- |
| | $Na_4P_2O_7$ | Sn | | | | Strip No. | Wt. change | Appearance |
| A | 0 | 0 | $HNO_3$ (0.6 g/l.) | 3.9 | 5.0 | 1–2 | +0.0005 | Slightly darker, but not corroded. |
| B | 0 | 0 | $H_2SO_4$ | 3.9 | 6.4 | 3–4 | −0.0300 | Badly corroded in spots. |
| C | 100 | 50 | $HNO_3$ (0.6 g/l.) | 4.0 | 4.8 | 5–6 | −0.0006 | Unchanged. |
| D | 100 | 50 | $H_2SO_4$ | 4.0 | 5.2 | 7–8 | −0.0048 | Severely corroded, but less than B. |

The test strips #1, 2, 5 and 6, from beakers A and C, containing hydrogen peroxide solution which had been treated with nitric acid to inhibit its pitting corrosive action on aluminum were substantially unchanged, there being no evidence of pitting and all were free from corrosion.

The test strips #3, 4, 7 and 8, from beakers B and D containing the hydrogen peroxide solution which had not been treated to inhibit its pitting corrosive action on aluminum, were badly corroded in spots. Moreover measurements indicated that they had lost considerable weight as a result of the corrosion and all four strips were badly pitted.

Any practical concentration of hydrogen peroxide may be stored in aluminum containers in accordance with my invention; and the peroxide may be stabilized by the addition of substances commonly used for that purpose. The aluminum container need not necessarily be of pure aluminum but various aluminum alloys may be used, provided that aluminum is the predominating constituent thereof.

In the appended claims, the term "soluble nitrate" is intended to include nitric acid as well as its salts.

I claim:

1. A method of inhibiting pitting corrosion of aluminum by an acidic hydrogen peroxide solution in contact therewith comprising adding a soluble nitrate to said solution in an amount sufficient to prevent any substantial pitting of said aluminum.

2. A method of inhibiting pitting corrosion of aluminum by an acidic hydrogen peroxide solution in contact therewith comprising adding ammonium nitrate to said solution in an amount sufficient to prevent any substantial pitting of said aluminum.

3. A method of inhibiting uniform and pitting corrosion of aluminum by an acidic hydrogen peroxide solution in contact therewith comprising adding to said solution 0.1–0.5 grams per liter of ammonium nitrate, and adjusting the acidity of said solution to a pH of substantially not less than 1.5.

4. A method of inhibiting uniform and pitting corrosion of aluminum by a hydrogen peroxide solution in contact therewith comprising adding to said solution 0.1–0.5 grams of ammonium nitrate per liter, and adjusting the acidity of said solution to a pH of 3.5–6.

5. A method of inhibiting pitting corrosion of aluminum by an acidic hydrogen peroxide solution in contact therewith comprising treating said aluminum with nitric acid and adding to said solution a soluble nitrate in an amount sufficient to prevent any substantial pitting of said aluminum.

6. A method of inhibiting pitting corrosion of aluminum by an acidic hydrogen peroxide solution having an acidity corresponding to a pH of substantially not less than 1.5 in contact therewith comprising treating said aluminum with nitric acid and adding ammonium nitrate to said solution in an amount sufficient to prevent any substantial pitting of said aluminum.

7. A method of inhibiting uniform and pitting corrosion of aluminum by a hydrogen peroxide solution in contact therewith comprising treating said surface with 50–100% nitric acid for 9–16 hours, adding to said solution 0.1–0.5 grams per liter of ammonium nitrate and adjusting the acidity of said solution to a pH of 3.5–6.

8. A package containing acidic aqueous hydrogen peroxide solution comprising an aluminum container the inner surface of which has been treated with 50–100% nitric acid.

9. A package containing acidic aqueous hydrogen peroxide solution comprising an aluminum container the inner surface of which has been treated with 50–100% nitric acid solution for 9–16 hours.

10. A hydrogen peroxide package comprising an aluminum container and an acidic hydrogen peroxide solution within said container, said solution having a sufficient amount of nitrate dissolved therein to substantially completely prevent pitting corrosion of said container.

11. A hydrogen peroxide package comprising an aluminum container and an acidic hydrogen peroxide solution within said container, said solution containing a stabilizer and a soluble nitrate which has substantially no catalytic effect on the decomposition of hydrogen peroxide and which is added in a sufficient amount to inhibit the pitting corrosion of said container.

12. A hydrogen peroxide package comprising an aluminum container and an acidic hydrogen peroxide solution within said container having an acidity corresponding to a pH of substantially not less than 3.5, having dissolved therein an amount of ammonium nitrate sufficient to inhibit the corrosion of said container and a stabilizer dissolved therein.

13. A hydrogen peroxide package comprising an aluminum container and a hydrogen peroxide solution within said container, said solution having dissolved therein a stabilizer and 0.1–0.5 grams per liter of ammonium nitrate and having an acidity corresponding to a pH of 1.5–6.

14. A hydrogen peroxide package comprising an aluminum container the inside surface of which has been rendered passive with nitric acid and an acidic hydrogen peroxide solution within said container, said solution containing a stabilizer and a soluble nitrate which has substantially no catalytic effect on the decomposition of hydrogen peroxide and which is added in a sufficient amount to inhibit the pitting corrosion of said container.

15. A hydrogen peroxide package comprising an aluminum container the inside surface of which has been rendered passive with nitric acid and an acidic hydrogen peroxide solution within said container having an acidity corresponding to a pH of substantially not less than 3.5 having dissolved therein an amount of ammonium nitrate sufficient to inhibit the corrosion of said container and a stabilizer dissolved therein.

16. A hydrogen peroxide package comprising an aluminum container, the inside surface of which has been treated with 50–100% nitric acid solution for 9–16 hours and within said container a solution of hydrogen peroxide, said solution having dissolved therein 0.1–0.5 grams per liter of ammonium nitrate and having an acidity corresponding to a pH of 3.5–6.

17. In combination, an aluminum vessel and contained therein an acidic hydrogen peroxide solution containing in solution a nitrate in an amount sufficient to substantially inhibit pitting corrosion of said vessel.

18. In combination, a package for acidic aqueous hydrogen peroxide solution comprising an aluminum container the inner surface of which has been rendered passive with nitric acid and an acidic hydrogen peroxide solution containing in solution a nitrate which has substantially no catalytic effect on the decomposition of hydrogen peroxide, said nitrate being added in an amount sufficient to substantially inhibit pitting corrosion of said container.

19. In combination, a package for acidic aqueous hydrogen peroxide solution comprising an aluminum container the inner surface of which has been rendered passive with nitric acid and containing a hydrogen peroxide solution having a pH of 1.5–6 and containing in solution a nitrate which has substantially no catalytic effect on the decomposition of hydrogen peroxide, said nitrate being added in an amount sufficient to substantially inhibit pitting corrosion of said container.

20. In combination, a package for acidic aqueous hydrogen peroxide solution comprising an aluminum container the inner surface of which has been rendered passive with nitric acid and containing a hydrogen peroxide solution having a pH of 3.5–4.5 and containing in solution a nitrate which has substantially no catalytic effect on the decomposition of hydrogen peroxide, said nitrate being added in an amount sufficient to substantially inhibit pitting corrosion of said container.

21. In combination, an aluminum vessel and contained therein an acidic hydrogen peroxide solution containing in solution a nitrate in an amount sufficient to substantially inhibit pitting corrosion of said vessel and a stabilizer.

22. In combination, a package for acidic aqueous hydrogen peroxide solution comprising an aluminum container the inner surface of which has been rendered passive with nitric acid and an acidic hydrogen peroxide solution containing in solution a nitrate which has substantially no catalytic effect on the decomposition of hydrogen peroxide, said nitrate being added in an amount sufficient to substantially inhibit pitting corrosion of said container and a stabilizer.

23. In combination, a package for acidic aqueous hydrogen peroxide solution comprising an aluminum container the inner surface of which has been rendered passive with nitric acid and a hydrogen peroxide solution having a pH of 1.5–6 and containing in solution a nitrate which has substantially no catalytic effect on the decomposition of hydrogen peroxide, said nitrate being added in an amount sufficient to substantially inhibit pitting corrosion of said container and a stabilizer.

24. A method of inhibiting pitting corrosion of aluminum by an acidic hydrogen peroxide solution in contact therewith comprising adding nitric acid to said solution and thereafter adjusting the pH to substantially not less than 1.5.

25. A method of inhibiting uniform and pitting corrosion of aluminum by an acidic hydrogen peroxide solution having an acidity corresponding to a pH of substantially not less than 1.5 in contact therewith comprising passivating said aluminum with nitric acid and adding nitric acid to said solution.

26. A hydrogen peroxide package containing an aluminum container and an acidic hydrogen peroxide solution within said container having an acidity corresponding to a pH of substantially not less than 1.5, said solution having nitric acid dissolved therein and a stabilizer.

27. A hydrogen peroxide package comprising an aluminum container the inside surface of which has been treated with nitric acid and an acidic hydrogen peroxide solution within said container having an acidity corresponding to a pH of substantially not less than 3.5, and having nitric acid and a stabilizer dissolved therein.

28. A method of inhibiting pitting corrosion of aluminum by an acidic hydrogen peroxide solution in contact therewith comprising adding sodium nitrate to said solution in an amount sufficient to prevent any substantial pitting of said aluminum.

29. A method of inhibiting uniform and pitting corrosion of aluminum by an acidic hydrogen peroxide solution having an acidity corresponding to a pH of substantially not less than 1.5 in contact therewith comprising passivating said aluminum with nitric acid and adding sodium nitrate to said solution in an amount sufficient to prevent any substantial pitting of said aluminum.

30. A hydrogen peroxide package containing an aluminum container and an acidic hydrogen peroxide solution within said container, said solution having dissolved therein an amount of sodium nitrate sufficient to inhibit the corrosion of said container and a stabilizer.

31. A hydrogen peroxide package comprising an aluminum container the inside surface of which has been rendered passive with nitric acid and an acidic hydrogen peroxide solution within said container having an acidity corresponding to a pH of substantially not less than 3.5 and having dissolved therein an amount of sodium nitrate sufficient to inhibit the corrosion of said container and a stabilizer dissolved therein.

32. Method of minimizing uniform corrosion of aluminum containers by hydrogen peroxide solution therein which comprises adjusting said solution to an acidity corresponding to a pH of 3.5–6.

33. A hydrogen peroxide package comprising an aluminum container and an acidic hydrogen peroxide solution within said container, said solution having an acidity corresponding to a pH of 3.5–6.

34. Method of minimizing the uniform and pitting corrosion of aluminum containers by hydrogen peroxide in contact therewith comprising treating said aluminum with 50–100% nitric acid and adjusting the acidity of the hydrogen peroxide to a pH of 3.5–6, and then placing the hydrogen peroxide in said container.

35. A hydrogen peroxide package comprising an aluminum container the inner surface of which has been treated with 50–100% nitric acid and a hydrogen peroxide solution in contact with the aluminum of said container, said solution having an acidity corresponding to a pH of 3.5–6, and then placing the hydrogen peroxide in said container.

JOSEPH S. REICHERT.

CERTIFICATE OF CORRECTION.

Patent No. 2,008,726.            July 23, 1935.

JOSEPH S. REICHERT.

It is hereby certified that error appears in the printed specification of the above numbered patent requiring correction as follows: Page 5, second column, line 41, claim 27, for "treated" read rendered passive; and that the said Letters Patent should be read with this correction therein that the same may conform to the record of the case in the Patent Office.

Signed and sealed this 24th day of September, A. D. 1935.

(Seal)            Leslie Frazer
           Acting Commissioner of Patents.

CERTIFICATE OF CORRECTION.

Patent No. 2,008,726.　　　　　　　　　　　　　　　　July 23, 1935.

JOSEPH S. REICHERT.

It is hereby certified that error appears in the printed specification of the above numbered patent requiring correction as follows: Page 5, second column, line 41, claim 27, for "treated" read rendered passive; and that the said Letters Patent should be read with this correction therein that the same may conform to the record of the case in the Patent Office.

Signed and sealed this 24th day of September, A. D. 1935.

(Seal)　　　　　　　　　　　　　　　　　　　　　　　Leslie Frazer
　　　　　　　　　　　　　　　　　　　　　　Acting Commissioner of Patents.